United States Patent
Weinstein et al.

(10) Patent No.: US 6,251,452 B1
(45) Date of Patent: *Jun. 26, 2001

(54) APPARATUS AND METHODS FOR MAKING MULTIPLE, COMPLEXLY PATTERNED EXTRUDATES

(75) Inventors: James N. Weinstein, Maple Grove; Scott A. Tolson, Arden Hills; James R. Borek, Burnsville; Peter A. Huberg, Shoreview; Thomas Jarl, Golden Valley; Philip K. Zietlow, Wayzata; Bernhard van Lengerich, Plymouth, all of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/298,716

(22) Filed: Apr. 23, 1999

(51) Int. Cl.[7] .................................................. A23L 1/27

(52) U.S. Cl. ................. 426/249; 426/250; 426/391; 426/446; 426/496; 426/497; 426/512; 426/516; 426/518; 426/549; 426/559; 426/571; 426/660

(58) Field of Search .................... 426/249, 250, 426/660, 516, 497, 446, 391, 496, 512, 518, 549, 559, 571

(56) References Cited

U.S. PATENT DOCUMENTS

| D. 241,183 | 8/1976 | Camollo . |
|---|---|---|
| D. 328,664 | 8/1992 | Leahy . |
| D. 368,791 | 4/1996 | Laughlin . |
| D. 372,352 | 8/1996 | Laughlin . |
| D. 373,671 | 9/1996 | Laughlin et al. . |
| D. 374,755 | 10/1996 | Gobble et al. . |
| D. 376,039 | 12/1996 | Pike . |
| D. 395,535 | 6/1998 | Reichkitzer et al. . |
| D. 403,485 | 1/1999 | Clanton et al. . |
| 449,854 | 4/1891 | Herrold . |
| 518,942 | 5/1894 | Duhrkop . |
| 1,640,842 | 8/1927 | Loomis . |
| 1,710,369 | 4/1929 | Martin . |
| 2,142,088 | 1/1939 | Anderson . |
| 2,329,418 | 9/1943 | Persson . |
| 2,366,417 | 1/1945 | MacMillin . |
| 2,537,977 | 1/1951 | Dulmage . |

(List continued on next page.)

FOREIGN PATENT DOCUMENTS

| 2167536 | 8/1973 | (DE) . |
|---|---|---|
| 0 202 143 | 11/1986 | (EP) . |
| 0 253 763 | 1/1988 | (EP) . |
| 0 280 484 | 8/1988 | (EP) . |
| WO 95/31108 | 11/1995 | (WO) . |
| WO 96/39039 | 12/1996 | (WO) . |

OTHER PUBLICATIONS

Good Housekeeping Illustrated Cookbook, 1989, Element A Slice of Bread, p. 433.
Rambauer et al., 1973, *Joy of Cooking* pp. 682–683.

Primary Examiner—Cynthia L. Nessler
(74) Attorney, Agent, or Firm—John A. O'Toole; Douglas J. Taylor; Everett G. Diederiks (57) ABSTRACT

Apparatus (10) and methods are disclosed where plastic extrudable food product is provided such as by an extruder or pump and is combined with another food product without intermixing to form a complexly patterned food product, such as by a pattern forming die (20). The cross-sectional area of the patterned food product is reduced from an inlet end (34) to an outlet end (36) by a factor of 4:1 to as much as 50:1 at an average convergence angle of 5 to 65° while maintaining the cross-sectional pattern to form a reduced cross-sectional patterned food product, and then is extruded through a die port having an opening equal to the reduced cross-sectional area to form a complexly patterned extrudate.

31 Claims, 6 Drawing Sheets

U.S. PATENT DOCUMENTS

| | | |
|---|---|---|
| 2,722,177 * | 11/1955 | Routh . |
| 2,747,522 | 5/1956 | Newland . |
| 2,764,995 | 10/1956 | Krupp et al. . |
| 2,774,314 | 12/1956 | Moser . |
| 2,847,311 * | 8/1958 | Doumak et al. . |
| 2,858,217 | 10/1958 | Benson . |
| 2,858,219 | 10/1958 | Benson . |
| 2,874,649 | 2/1959 | Pelletier . |
| 3,014,437 * | 12/1961 | Dutchess . |
| 3,054,143 | 9/1962 | Stenger . |
| 3,057,009 | 10/1962 | Lipski . |
| 3,062,661 * | 11/1962 | Doumak . |
| 3,221,372 | 12/1965 | Lieberman . |
| 3,241,503 | 3/1966 | Schafer . |
| 3,314,381 | 4/1967 | Fries et al. . |
| 3,318,706 | 5/1967 | Fast . |
| 3,338,724 | 8/1967 | Adler et al. . |
| 3,345,186 * | 10/1967 | Kania et al. . |
| 3,416,190 | 12/1968 | Mehnert . |
| 3,447,931 | 6/1969 | Benson et al. . |
| 3,499,766 | 3/1970 | Vollink et al. . |
| 3,541,946 | 11/1970 | Johnston . |
| 3,558,324 | 1/1971 | Page et al. . |
| 3,561,053 | 2/1971 | Pearson . |
| 3,615,645 | 10/1971 | Forkner . |
| 3,622,353 | 11/1971 | Bradshaw et al. . |
| 3,690,896 | 9/1972 | Maxwell . |
| 3,764,715 | 10/1973 | Henthorn et al. . |
| 3,779,676 | 12/1973 | Bernard . |
| 3,816,632 | 6/1974 | Hamlyn et al. . |
| 3,852,494 | 12/1974 | Williamson . |
| 3,876,743 * | 4/1975 | Soderlund et al. . |
| 3,885,053 | 5/1975 | Townsend . |
| 3,925,563 | 12/1975 | Straughn et al. . |
| 3,948,079 | 4/1976 | Fuchs, Jr. . |
| 3,971,853 | 7/1976 | Crowder . |
| 3,976,793 | 8/1976 | Olson et al. . |
| 4,032,279 | 6/1977 | Kim . |
| 4,044,159 | 8/1977 | Lutz . |
| 4,061,786 | 12/1977 | Winkler et al. . |
| 4,076,477 | 2/1978 | Hacke . |
| 4,093,414 | 6/1978 | Swiatovy, Jr. . |
| 4,139,644 | 2/1979 | Stephenson . |
| 4,225,630 | 9/1980 | Pitchon . |
| 4,259,051 | 3/1981 | Shatila . |
| 4,395,217 | 7/1983 | Benadi . |
| 4,410,552 | 10/1983 | Gaffney et al. . |
| 4,445,838 | 5/1984 | Groff . |
| 4,459,094 | 7/1984 | Sanabria . |
| 4,484,877 | 11/1984 | Stucke et al. . |
| 4,504,511 | 3/1985 | Binley . |
| 4,542,686 | 9/1985 | Bansal . |
| 4,563,358 | 1/1986 | Mercer et al. . |
| 4,567,055 | 1/1986 | Moore . |
| 4,585,407 | 4/1986 | Silver et al. . |
| 4,610,844 | 9/1986 | Matthews et al. . |
| 4,614,489 | 9/1986 | Juravic . |
| 4,623,546 | 11/1986 | Holay et al. . |
| 4,626,187 | 12/1986 | Kamada . |
| 4,648,821 | 3/1987 | Thulin . |
| 4,659,580 | 4/1987 | Svengren . |
| 4,678,423 | 7/1987 | Bertolotti . |
| 4,695,236 | 9/1987 | Predohl et al. . |
| 4,698,004 | 10/1987 | Ramnarine . |
| 4,715,803 | 12/1987 | Koppa . |
| 4,748,031 | 5/1988 | Koppa . |
| 4,785,551 * | 11/1988 | Meyer . |
| 4,786,243 | 11/1988 | Kehoe . |
| 4,790,996 | 12/1988 | Roush et al. . |
| 4,851,248 | 7/1989 | Simelunas et al. . |
| 4,854,842 | 8/1989 | Kobayashi . |
| 4,882,185 | 11/1989 | Simelunas et al. . |
| 4,888,192 | 12/1989 | Ramnarine . |
| 4,940,593 | 7/1990 | Duffy . |
| 4,990,293 | 2/1991 | Macosko et al. . |
| 5,004,619 | 4/1991 | Kobayashi . |
| 5,019,404 | 5/1991 | Meisner . |
| 5,066,435 | 11/1991 | Lorenz et al. . |
| 5,102,602 | 4/1992 | Ziegler . |
| 5,149,555 | 9/1992 | Flindall . |
| 5,165,949 | 11/1992 | Farnsworth et al. . |
| 5,176,936 | 1/1993 | Creighton et al. . |
| 5,264,232 | 11/1993 | Campbell . |
| 5,286,183 | 2/1994 | Tonsi et al. . |
| 5,350,589 | 9/1994 | Weinstein et al. . |
| 5,399,368 | 3/1995 | Garwood et al. . |
| 5,439,695 | 8/1995 | Mackey . |
| 5,486,049 | 1/1996 | Boatman et al. . |
| 5,556,653 | 9/1996 | Binley . |
| 5,571,326 | 11/1996 | Boissonnat et al. . |
| 5,614,240 | 3/1997 | Young . |
| 5,620,713 | 4/1997 | Rasmussen . |
| 5,639,485 | 6/1997 | Weinstein et al. . |
| 5,643,618 | 7/1997 | Weinstein et al. . |
| 5,670,185 | 9/1997 | Heck et al. . |
| 5,674,440 | 10/1997 | Klinedinst . |
| 5,709,902 | 1/1998 | Bartolomei et al. . |
| 5,759,503 * | 6/1998 | Francisco et al. . |
| 5,776,534 | 7/1998 | Christensen et al. . |
| 5,827,557 | 10/1998 | Weinstein et al. . |
| 5,843,503 | 12/1998 | Clanton et al. . |
| 5,882,710 | 3/1999 | Jury . |
| 5,955,116 * | 9/1999 | Kehoe et al. . |
| 6,001,402 * | 12/1999 | Dupont . |
| 6,143,339 * | 11/2000 | Weinstein et al. . |

* cited by examiner

APPARATUS AND METHODS FOR MAKING MULTIPLE, COMPLEXLY PATTERNED EXTRUDATES

FIELD OF THE INVENTION

The present invention comprises apparatus and methods for making complexly patterned multicolored extruded food products. More particularly, the present invention relates to apparatus and methods for reducing a large cross sectional area complexly patterned food extrudate to a smaller area while maintaining the complex pattern, to apparatus and methods for adjusting flow of plastic extrudable food product, and to a manifold for making multiple extrudates formed of plastic extrudable food product and having uniformity of flow.

BACKGROUND

Food products such as Ready-To-Eat ("R-T-E") cereals and snack products vary widely in composition, shape, color, flavor, texture, etc. Such products can include both puffed and unpuffed varieties. One attractive feature is their appearance which can include specific attributes such as shape and coloration. Especially attractive are products having a complex but organized pattern of coloration, shape and/or complex shape.

A wide variety of techniques are known to provide complexly shaped products such as rings, stars, letters, figures, etc. Problems generally include how to provide consistently the desired degree of shape detail or resolution in the finished pieces. Similarly, for colored products, a problem is how to consistently provide a fine level of detail. This problem of imparting a fine level of detail is particularly difficult in the provision of complexly patterned R-T-E cereals due to their generally smaller size. The problem is even more severe for puffed R-T-E cereal products due to the very tiny size of the pellets that are expanded to form the finished products. Of course, the pellets must contain and retain the complex pattern.

In particular, it would be desirable to prepare puffed R-T-E cereals having a shape and color pattern reminiscent of various sports balls such as baseballs, footballs, basketballs and soccer balls, such as are disclosed in 1) U.S. Ser. No. 014,233, filed Oct. 18, 1993 by Laughlin et al. entitled Food Product Piece, 2) U.S. Ser. No. 014,068, filed Oct. 12, 1993 by Laughlin entitled Food Product Piece, 3) U.S. Ser. No. 014,474, filed Oct. 22, 1993 by Laughlin entitled Food Product Piece, and 4) U.S. Ser. No. 014,069, filed Oct. 12, 1993 by Laughlin entitled Food Product Piece, respectively, each of which are incorporated herein by reference. Such products are characterized in part by high degrees of resolution such as by line features (such as to indicate traditional sticking patterns) 1 mm> in thickness and even 0.5 mm>. Providing a cereal pellet which upon puffing provides a puffed R-T-E cereal exhibiting such a fineness of detail is a difficult problem to overcome.

Line colored or externally striped food products such as R-T-E cereals as well as apparatus and methods for their preparation are described in U.S. Pat. No. 2,858,217 entitled Cereal Product With Striped Effect and Method of Making Same (issued Oct. 28, 1958 to J. O. Benson) and which is incorporated herein by reference. The '217 patent describes an extrudate extruder having a color injecting die insert for making a complexly patterned extrudate. However, the extrudate is directly extruded without any reduction in its cross sectional area. Also, the method appears to be limited to producing only flakes in a simple pattern of generally parallel more or less straight lines. The method is not capable of generating a direct expanded cereal or snack (i.e., expanded directly from the extruder) having a line detail of such a degree of fineness.

An improvement or modification in the technique for providing a line colored cereal based snack piece is described in U.S. Pat. No. 3,447,931 (issued Jun. 3, 1969 also to Benson et al.) entitled Process For Preparing a Puffed, Concave Shaped Cereal Product. More particularly, the '931 patent describes a process for making a cup flower shaped R-T-E cereal piece having a complex line pattern. The process involves extruding a plurality of rope dough filaments which are pressed together to form a column or rope without a material decrease in the cross section which is then combined under conditions such that no puffing occurs. The composite strand of compressed filaments is then cut into wafers and which are subsequently heat puffed. While useful, the process appears to be limited to producing only the "flower bloom" shape. Also, the pieces prepared are of a larger snack piece size rather than the relatively smaller pieces characteristic of R-T-E cereals.

Especially in commercial applications, the plastic extrudable food product is supplied in an amount to form a plurality of extrudates. Problems then arise that extrudates have uniformity of flow for consistency in the final product, with adjustment of the flow rate and pressure being accomplished without increasing the likelihood of downstream plugging. Furthermore, problems also arise that the extrudates interfere with each other such as by falling on top of each other thereby making downstream processing difficult.

In a first aspect, the present invention provides an improvement in apparatus and methods for preparing food products characterized by at least two colors in an organized pattern. In particular, the present invention provides an improvement in the degree of fineness level of color detail (1 mm>) even on food products such as pellets for puffed R-T-E cereals that are very small (e.g., 3 to 6 mm) in diameter.

In a further aspect, the present invention provides an improvement in apparatus and methods for adding additives in flowing dough. In particular, the additives are added in interstitial gaps imparted in the flowing dough, with portions of the interstitial gaps being filled upstream of the addition of the additives to prevent the additives flowing into those portions. It is an aim of the present invention to prevent a disproportionate amount of additives from being on the outside of the flowing dough.

In a still further aspect, the present invention provides a flow rate adjustment apparatus for adjustment of plastic extrudable food flow. In particular, the present invention provides an improvement that the flow of dough is not stopped or allowed to build up which can lead to hardening of the dough, with hardened dough potentially causing plugging problems downstream.

In another aspect, the present invention provides a manifold where the extrudates are located in a non-circular pattern avoiding the problems of individual extrudates interfering with each other and allowing easier placement on horizontally arranged conveyors. In particular, the present invention provides an improvement that the extrudates are in a horizontal pattern in a single plane.

The present invention provides further improvements in food products and their methods of preparation described in Apparatus and Methods for Making Complexly Patterned Extrudates (U.S. Ser. No. 849,848 filed May 23, 1997, or equivalently WO 95/31108 published Nov. 23, 1995) which is incorporated herein by reference. More particularly, the present improvements involve the realization that the methods, apparatus, and techniques can be applied to not only the incompressible fluids described in WO95/311108 but also to compressible fluids such as confectionery foams.

BRIEF DESCRIPTION OF THE DRAWING

FIG. 11 is a partial cross-sectional view of the manifold taken along lines 11—11 of FIG. 10.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DESCRIPTION

Figure 1:
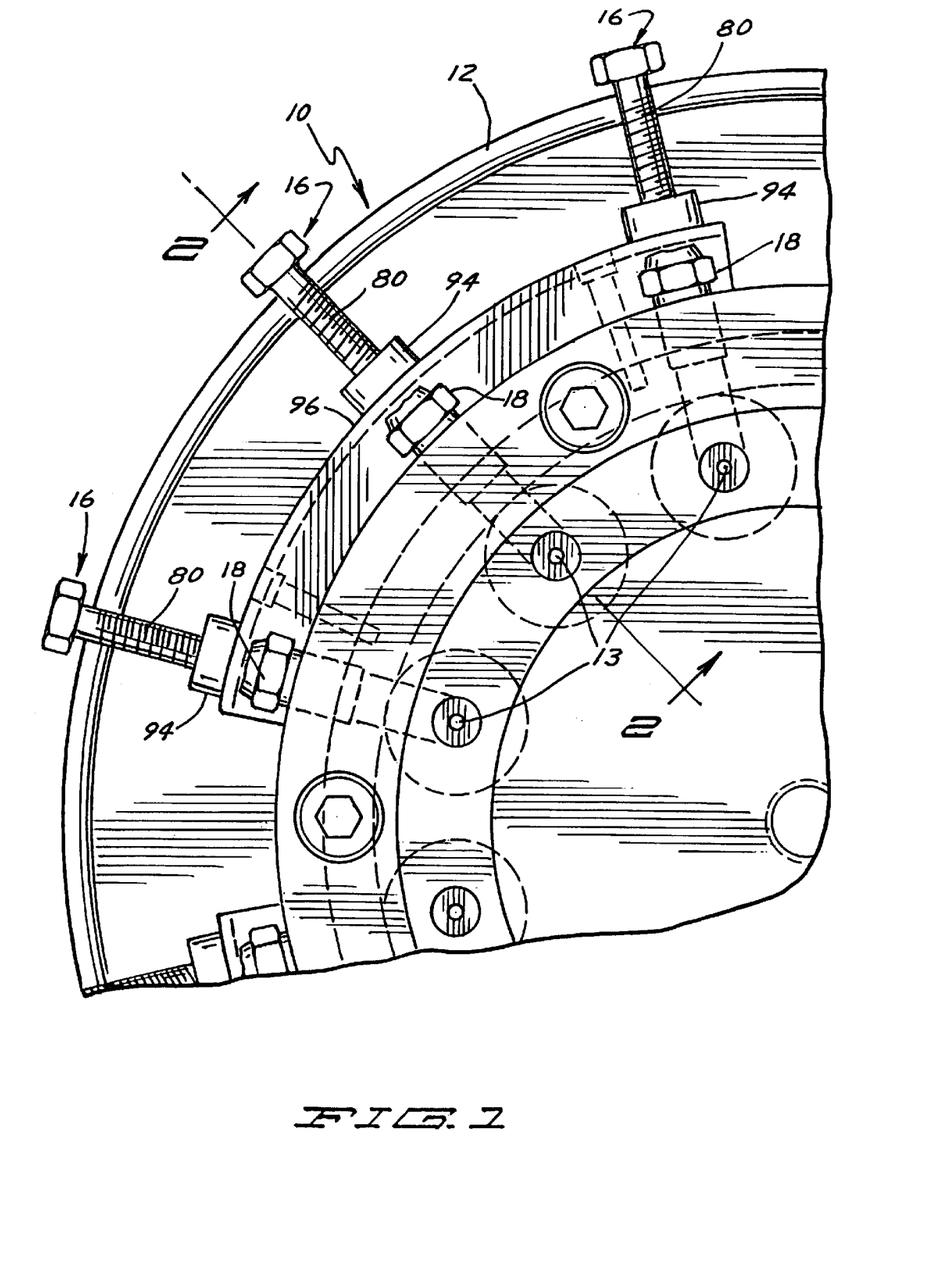
FIG. 1 is an end view partially cut away of the die face of a food cooker extruder showing a plurality of exit ports.

Referring now to the drawing and briefly in particular to FIG. 1, there is shown an apparatus for preparing a complexly patterned cereal dough piece according to the preferred teachings of the present invention that is generally designated 10. In the most preferred form, apparatus 10 generally includes a means for providing at least one extrudable food product or cooked cereal dough such as a cooker extruder 12 as seen in FIG. 1. Extruder 12 is seen to have at least one, and more preferably a plurality of, exit ports or orifices 13 each for extruding of a complexly patterned cooked cereal dough of the present invention (not shown) or other extrudable food product.

While a cooker extruder is the preferred equipment to provide the extrudable food, other conventional equipment and techniques can also be employed. For example, a batch cooker or semi-continuous cooker for cooking the ingredients in bulk can be equipped with dough forming and conveying extruder element. In other embodiments, e.g., a low moisture fruit paste, a simple screw conveyor can be employed. While in the present description particular reference is made to the provision of complexly patterned farinaceous materials such as R-T-E cereals and snack products, the skilled artisan will appreciate that the apparatus and techniques can be employed with a wide variety of extrudable food products, especially such plastic foods as low moisture fruit products.

Figure 2:
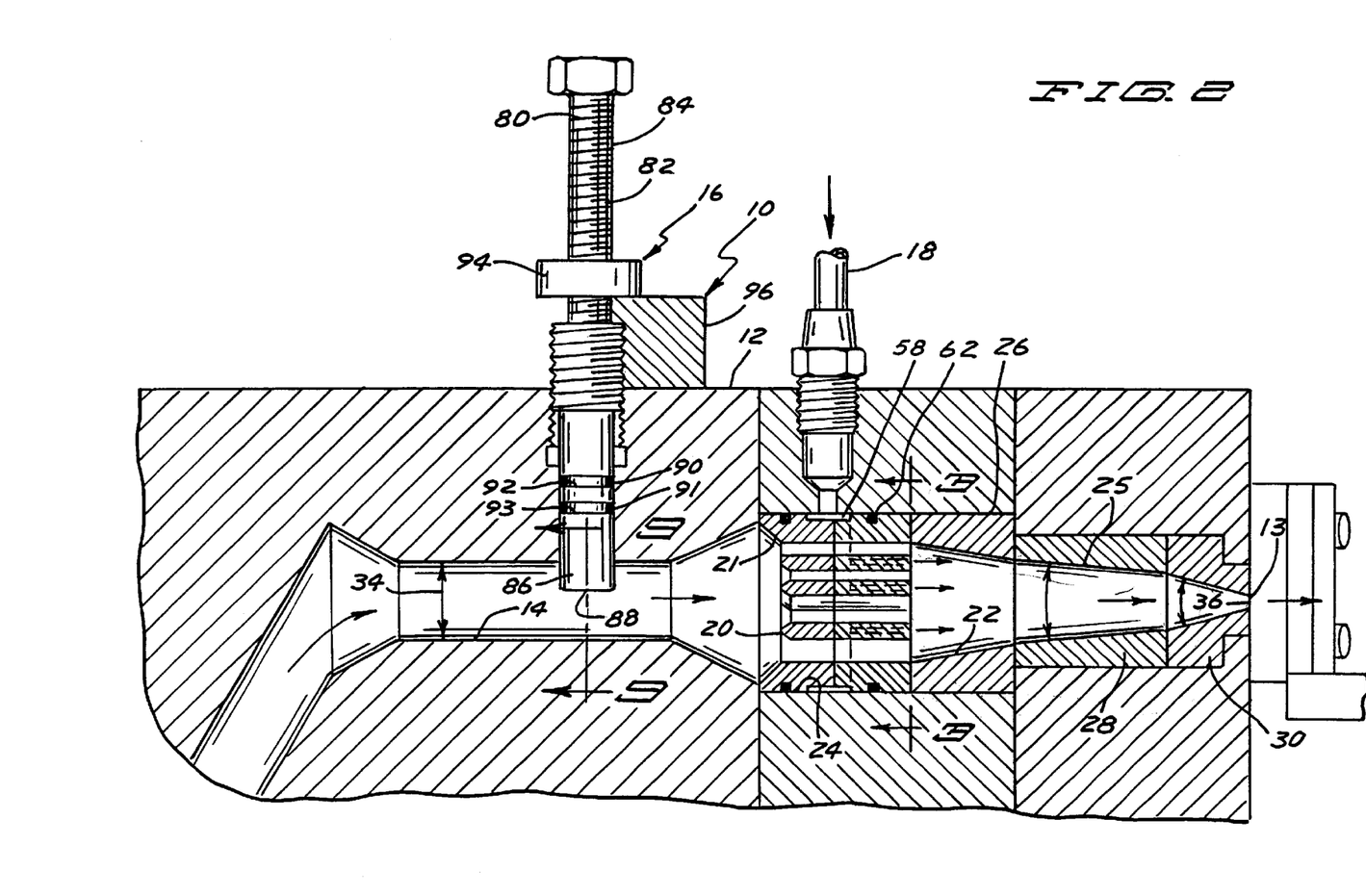
FIG. 2 is a sectional view greatly cut away of a reduction passageway of the present invention taken along lines 2—2 of FIG. 1.

Now referring to FIG. 2, the cooker extruder 12 provides the cooked cereal dough in quantity which can supply one or preferably, especially in commercial applications, a plurality of passageways 14, each leading to an exit port 13. In highly preferred embodiments, the apparatus 10 can additionally include a means for adjusting the cooked cereal dough flow rate and pressure such as the adjustably retractable dough flow adjuster plug 16 depicted. Such a flow rate adjustment means is particularly useful when, as in the embodiment depicted, the extruder supplies a large number of extrudate orifices. Absent such a flow rate adjustment means, the particular extrudate characteristics (e.g., pressure, mass flow) from each of so many orifices are difficult to control since the length of passageway 14 from the central supply can vary.

Flow adjuster plug 16 can include a rod or bolt 80 having at least upper and lower cylindrical portions 84 and 86. Upper portion 84 in the most preferred form includes threads 82. Lower cylindrical portion 86 is in the most preferred form of a plug having a smooth outer periphery of a diameter which is less than the diameter of passageway 14. Further, the inner axial end 88 of portion 86 opposite to portion 84 has a generally flat configuration and specifically has a diameter which is considerably larger than the diameter of passageway 14. Extruder 12 has a cylindrical bore which intersects generally perpendicular with passageway 14 and which includes a radially outward, threaded portion and a radially inward, smooth portion having a diameter generally equal to and for slideable and rotatable receipt of portion 86 such that the center line of portion 86 is generally perpendicular to the center line of passageway 14. Bolt 80 further includes a threaded portion located intermediate portions 84 and 86 of a size for threadable receipt in the extruder bore. Plug 16 further includes a means for sealing against dough of extruder 12 leaking from passageway 14 such as at least a first "O" ring 90, 91 inset into a receiving peripheral seal groove 92, 93, respectively. Plug 16 can further include lock nut 94 threaded on threads 82 of portion 84 and which can be tightened against block 96 to secure bolt 80 against movement such as caused by vibration of extruder 12.

By rotating bolt 80 into or out of the extruder bore, portion 86 can be adjustably retractably extended into passageway 14. It can then be appreciated that the area of flow through passageway 14 at plug 16 is inversely related to the extent that portion 86 extends into passageway 14. It should be appreciated that portion 86 can not choke or stop dough flow through passageway 14 or provide a buildup location for dough in passageway 14. In particular, due to the smaller diameter of portion 86 than passageway 14, the outer extent of portion 86 will extend along a chord of the circular cross section of passageway 14 at a spacing from its center less than its radius allowing flow of dough therebetween. It should be appreciated that due to the circular cross sections of portion 86, dough will tend to flow around portion 86 through passageway 14 and not stop in front thereof such as can occur if a flat or other non-cylindrical surface were presented. Likewise, when portion 86 is fully retracted out of passageway 14, the extruder bore does not form locations outside of passageway 14 in which dough can accumulate.

Further, due to the preferred shape of end 88 relative to passageway 14, even if bolt 80 were rotated such that end 88 engaged the wall in extruder 12 defining passageway 14, end 88 does not closely mate passageway 14 but will similarly generally extend along a chord of the circular cross section of passageway 14 at a spacing from its center less than its radius allowing flow of dough therebetween. Stopping dough flow or allowing dough buildup or accumulation can lead to hardening of the dough, with hardened dough potentially causing plugging problems downstream. In the most preferred form, with end 88 engaging the wall in extruder 12 defining passageway 14, portion 86 covers less than 90% of the cross-sectional area of passageway 14 allowing flow of dough through at least 10% of the cross-sectional area of passageway 14 at all times.

The apparatus 10 further essentially includes at least one food color supply 18 which can supply a flowable colored food material such as food color liquid (whether oil or preferably water based). The color supply 18 is in fluid communication with and the apparatus 10 further includes a means for mixing or forming the food color liquid and extrudable food product into a complexly patterned food extrudate such as a greatly enlarged (relative to the exit orifice) pattern forming die insert 20 depicted. In the preferred embodiment, the passageway 14 can include a first flared or divergent portion 21 immediately upstream of the die insert 20 to widen the passageway 14 to an equal diameter to the die insert 20 as well as a second convergent flared portion 22 downstream. In the drawing, the passageway 14 and other constituent elements are depicted in close to actual size. Thus, the diameter of the die insert 20 is about 30 mm and is positioned within a slightly enlarged portion 24 of passageway 14. As a result, the diameter of the complexly patterned dough extrudate as it exits the die insert 20 will have an enlarged initial diameter about 30 mm. Of course, other sizes for the die insert 20 can be used (e.g., 15 to 100 mm).

In FIG. 2, it can be seen that the complexly patterned dough extrudate so formed then moves through by pressure flow and apparatus 10 further includes a means for reducing the cross sectional area of the complexly patterned food extrudate while maintaining the pattern such as a reducing or necking passageway 25 depicted. The reducing passageway 25 can be fabricated from a single piece having, for example, a frusto conical bore or, as depicted, with a plurality of individual pieces such as the first, second, and third pieces 26, 28 and 30, respectively, depicted. Individual pieces can be more easily cleaned. Also, the convergence angle and other attributes, e.g., internal surface, can be adjusted as needed (e.g., smoothness, anti-stick surface) to accommodate differences in the extrudate characteristics of different food products. In FIG. 2, it is seen that the passageway 14 has an initial relatively larger diameter 34 and a final relatively smaller or exit diameter 36 at the exit port 13. Moreover, while the passageway 14 is depicted as having a circular cross sectional area, in other embodiments the passageway 14 can be fabricated with a more complex pattern or peripheral configuration to define or define in part the exterior shape or configuration of the finished piece, including both regular shapes (e.g., stars, rings, ovoids, geometric shapes) as well as irregular shapes (e.g., animals, objects such as trees, cars, etc.). Furthermore, the passageway 14 can be fabricated with an interior surface of desired characteristics, e.g., polished or Teflon or other non-sticking surface, such as to provide decreased friction to facilitate retention of the complex pattern or to reduce the pattern's deformation. Especially desirable is an ovoid cross section for the passageway for preparation of an American style football or a rugby ball.

An important feature of the present invention is the convergence angle of the reducing passageway 25. It has been found important to maintain an average convergence or confinement angle of 5° to 45°, preferably 5° to 20°, and most preferably 10° to 15° in order to maintain the pattern while the cross sectional area is reduced. By "average convergence" is meant the angle formed from the diameter of the die insert 20 to the diameter 36 of exit port 13 over the length of the reducing passageway 25. As depicted, with passageway pieces 26, 28, and 30, some pieces, e.g., 26 and 30, have a sharper convergence angle while piece 28 has a shallower angle. Internal obstructions (e.g., shoulders) are to be avoided so as to provide a continuous passageway to minimize disrupting the complex pattern formed in the dough. FIG. 2 shows that the exit orifice diameter 36 is about 3 mm. Since the passageway 14 can have a complex cross sectional shape as described above, the extent of reduction of the pattern is more aptly characterized in terms of cross sectional area reduction rather than more simply a reduction in diameter. Thus the degree of reduction of cross sectional area in the illustrated embodiment is about 100:1. Of course, for other embodiments (e.g., for larger snack pieces), the extent of cross section reduction can be as little as 25:1. The exit orifice diameter 36 for a snack product can be correspondingly larger, e.g., 5 to 15 mm.

Surprisingly, such a shallow convergence angle allows for a reduction in cross sectional areas of at least 50:1 and even about 100:1 while maintaining a fine level of detail in the complex pattern. Thus, a complex shape can be imparted to a larger dough face or cross section and then reduced to the much smaller desired finish cross sectional area. This arrangement allows for the fabrication of a relatively large die insert to impart the complex pattern. Fabricating a small die insert to impart the desired degree of detail for the final exit diameter while possible on a development scale extruder is not commercially practical due in part to plugging or fouling of the die insert 20. The provision of a reducing passageway 25 having the requisite convergence angle allows for the provision of three dimensional shapes to be produced with a fine level of color detail. Moreover, the finished pieces are characterized by a color through the entire piece as compared to only topical coloration.

Also, it is seen that the mixing is not immediately proximate the discharge port 13 but distanced therefrom. This allows for the dough to modestly "set" so as to assist in maintaining the complex shape.

Figure 3:
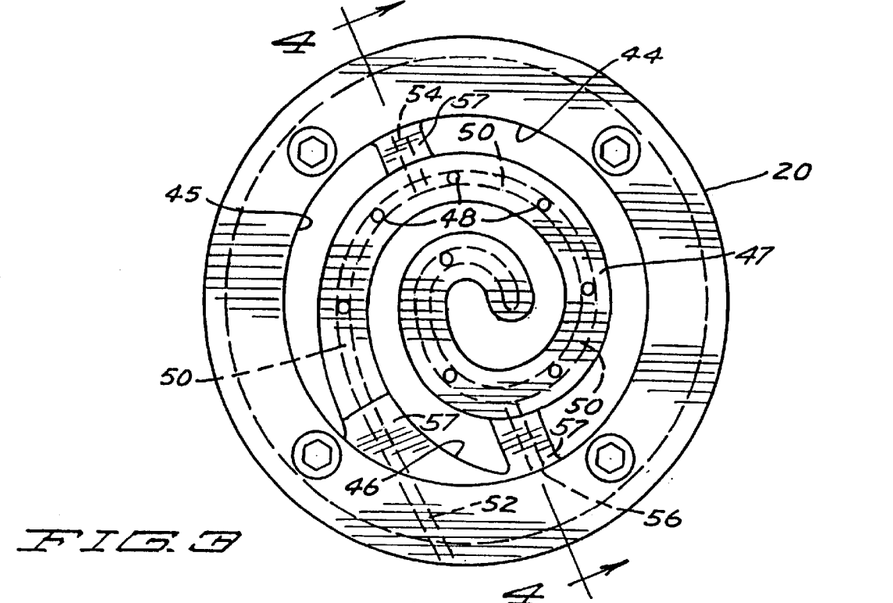
FIG. 3 shows an enlarged sectional view of a die insert for making an enlarged complexly shaped dough taken along lines 3—3 of FIG. 2.
Figures 5, 7:
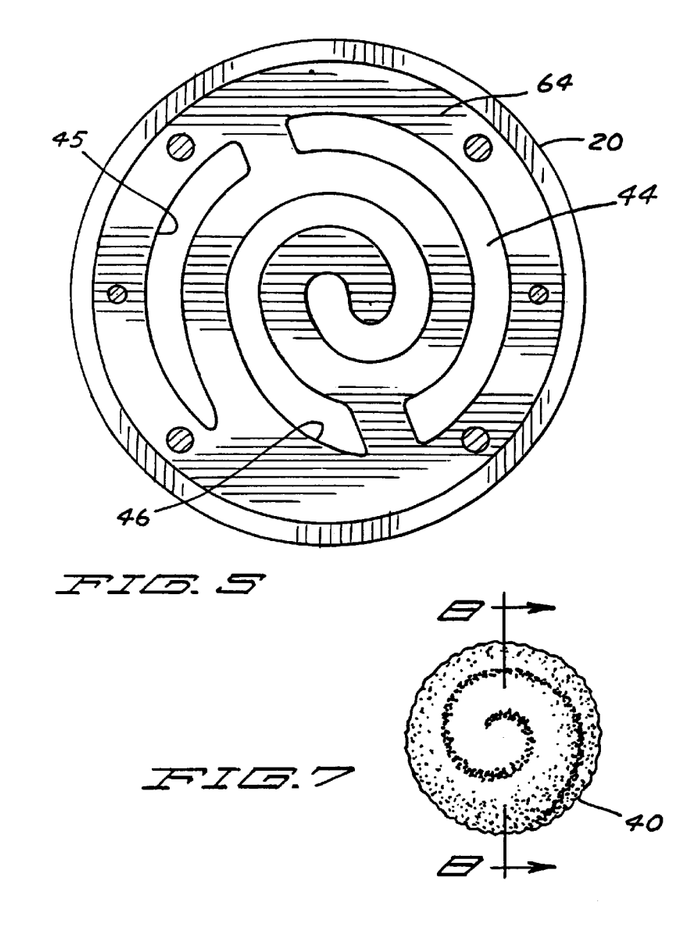
FIG. 5 is an enlarged sectional view of the die insert taken along lines 5—5 of FIG. 4 in an upstream orientation.
FIG. 7 is an enlarged plan view of a finished puffed complexly patterned R-T-E cereal piece prepared using the present methods and apparatus.

Reference is now made to FIG. 3 which shows an enlarged cross section of the pattern forming die insert 20. As can be seen, this particular die insert can be used to fabricate a bicolored food piece 40 as seen in FIG. 7 having a swirl or spiral pattern. However, other pattern forming die inserts can be substituted therefor which, for example, can impart the line pattern for products reminiscent of soccer balls, basketballs, baseballs, and other sports objects.

The die insert 20 includes a means for imparting at least one, and more desirably a plurality of, dough interstitial gaps such as between a plurality of dough dividing passageways such as passageways 44, 45, and 46 respectively formed by die dividing members 47. The die insert 20 can further include a means for injecting a food color or second colored dough into the interstitial dough gaps such as a plurality or array of evenly spaced food color injection ports 48 formed in die dividing members 47 and fed by a fluid supplying passageway 50 therethrough. The extrudable food product itself may be colored. The color supply 18 may supply a different color or the same color having a darker or lighter hue. Specifically, the food color passageways 50 are supplied with the food liquid from one or more food color supply ports such as ports 52, 54, and 56, respectively in the die dividing members 47. Of course, when the second or colored material is a food product such as a second dough or fruit paste, the passageways and injection ports can be enlarged to reduce friction and the potential for blockage.

Figure 4:
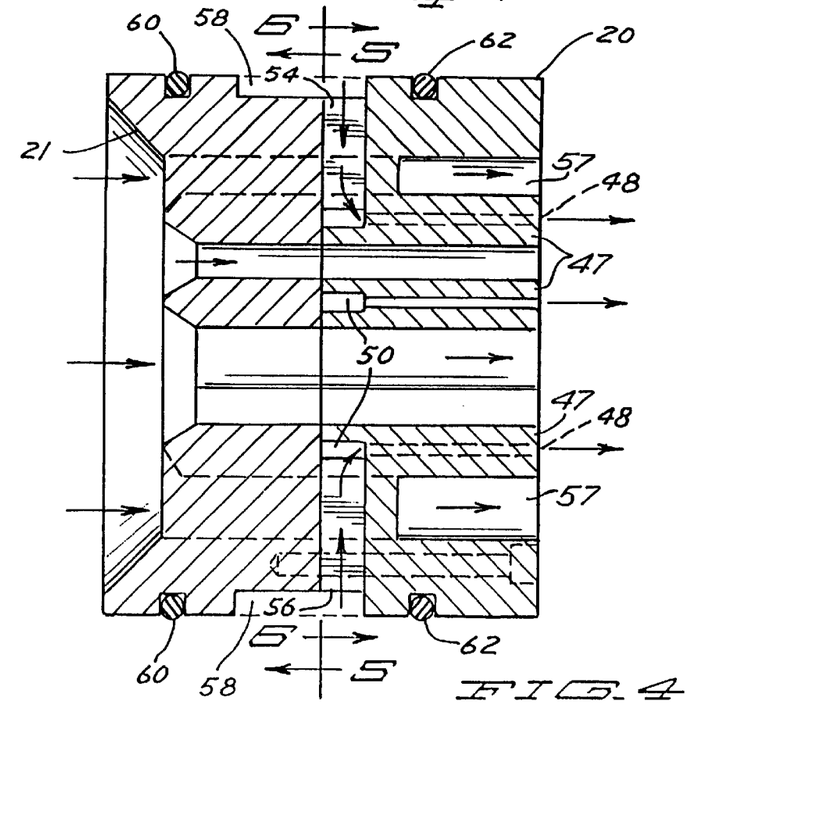
FIG. 4 is an enlarged sectional view of a die insert showing the channels for the food color flow taken along lines 4—4 of FIG. 3.

Referring now briefly to FIG. 4, it can be seen that the die insert 20 can further include a color fluid supply reservoir 58 supplied by the color supply 18 and which is in fluid communication with or supplies food color supply ports 52, 54, and 56. The die insert 20 can further include a means for sealing the color fluid supply reservoir 58 against premature admixture with dough such as "O" rings 60 and 62 depicted.

Reference is now briefly made to FIG. 5 which shows the upstream face 64 of the die insert 22. FIG. 5 shows that the upstream face 64 for this particular die insert contains no color supply discharge ports and that the discharge of color is preferably in a downstream direction.

Figure 6:
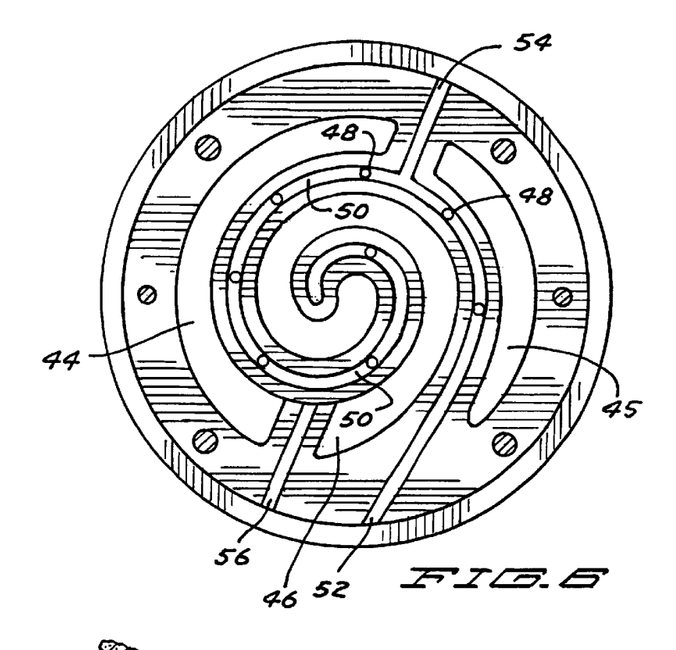
FIG. 6 is an enlarged sectional view of the die insert taken along lines 5—5 of FIG. 4 similar to FIG. 5 but showing a downstream orientation.

Reference is now made briefly to FIG. 6 wherein the relationship between the supply inlet ports 52, 54, and 56, supply passageways 50 and color discharge ports 48 can be most simply seen. It can then be appreciated that the color will tend to fill the interstitial gaps in the flowing dough between passageways 44, 45, and 46 formed by and behind die dividing members 47 to create a line in the shape of die dividing members 47 in the extruded dough flow. Referring now to FIGS. 3 and 4, notches 57 are provided in die dividing members 47 extending axially from the downstream face towards but spaced from upstream face 64 and specifically upstream from the discharge ends of ports 48. The axial length of notches 47 is sufficient such that the dough extruded through passageways 44, 45, and 46 tends to flow into and fill the portions of the interstitial gaps in notches 47 upstream of where the color is discharged from ports 48. The portions of the interstitial gaps axially in line with notches 47 are then filled with dough upstream from where the color is discharged to prevent color added by ports 48 from flowing into those portions.

In the preferred form shown in FIGS. 3 and 4, notches 47 are shown formed in die dividing members 47 intermediate ports 48 and the interior surface wall and in the preferred form adjacent to the interior surface wall of die insert 20. If die dividing members 47 extend to and engage the interior surface wall of die insert 20, color will tend to travel in the interstitial gaps all the way to the interior surface wall of die insert 20 and will tend to fill the void between the dough passing through passageways 44, 45, and 46 and the interior surface wall of die insert 20. This leads to a disproportionate amount of color being on the outside of the extruded dough. Thus, notches 47 generally prevent color from traveling all the way to the interior surface wall of die insert 20 to practically eliminate or reduce the color on the outside of the extruded dough.

It can also be appreciated that notches 57 can also be provided in die dividing members 47 spaced from the interior surface wall of die insert 20. One reason for such an arrangement would be where multiple colors are desired in the extruded dough. This can be accomplished by supplying a first color to certain of the ports 48 with the other ports 48 being supplied with a different color(s) or hue(s). Notches 47 can then be provided in die dividing members 47 separating those certain ports 48 from the other ports 48 to generally prevent intermixing of the additives in the extruded dough.

Figure 8:
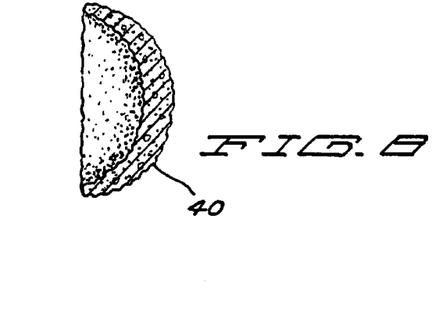
FIG. 8 is an enlarged sectional view of the R-T-E cereal piece taken along lines 8—8 of FIG. 7 showing the concave shape of the cereal piece.
Figure 9:
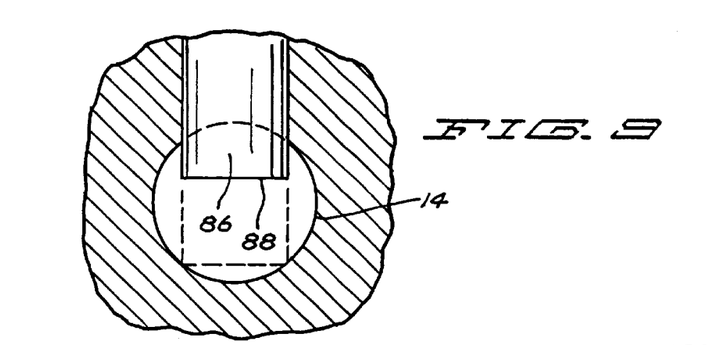
FIG. 9 is a partial sectional view of the food cooker extruder taken along lines 9—9 of FIG. 2.

Reference now is next briefly made to FIGS. 7 and 8 which show that the food piece 40 can have a cupped shape and that the coloration can extend throughout the body of the piece. The piece 40 depicted is a puffed R-T-E cereal piece prepared by direct expansion from the extruder having a finished diameter of about 70 mm.

In the present invention, the complexly patterned dough of reduced cross sectional diameter is extruded through the reduced diameter exit orifice 36 (e.g., about 3 mm). Thereafter, the extrudate is face cut in a conventional manner to form individual pieces such as with one or more rotating knives. Depending upon the conditions of the extrudate, an unpuffed pellet piece can be formed for subsequent puffing, or, alternatively, and preferably herein, a directly expanded finished puffed piece is formed. The finished food piece whether subsequently puffed or puffed by direct expansion upon exiting the exit orifice 13 is essentially characterized by exhibiting a high resolution or fine degree of color detail. The detail can include surface line coloration of as thin as about 0.5 mm in the puffed product. In certain embodiments, the interior is also bicolored or multicolored as well as having topical or surface coloration.

The extrudable food can comprise a wide variety of conventional food types and in particular can include a fruit paste, potato dough (e.g., for a fabricated chip) or a cooked cereal dough. The cooked cereal dough can be for either R-T-E cereals (whether puffed or unpuffed), snack products, baked goods, or pastas. Especially desirable are cooked cereal doughs for puffed R-T-E cereals. Puffed food products such as snacks can be prepared by hot air puffing, deep fat frying, gun puffing or microwave (especially high intensity, e.g., >100 V/cm field strength). Product puffed without deep fat frying can have oil added to the composition or have a topical oil application. R-T-E cereals can have a sugar coating. Puffed food pieces of the product base (i.e., prior to or without oil or sugar) can have a density of a about 0.1 to 0.5 g/cc. The colored portion forms a line or a plane through the body of the food piece. "Highly complex" food products are characterized as having a plurality of colored features at least two of which (e.g., two planes or a line and a plane) intersect within the body of the food piece.

Surprising, the extrudable food can further comprise a compressible fluid such as an aerated confectionery foam at the point of intermixing with a second colored food material and finished aerated confectionery products prepared therefrom. By "aerated confection product" is meant an aerated confectionery food product, especially in solid form, having a density in the range of from about 0.10 to about 1.0 g/cc and comprising from about 1 to about 30% of water, based on the total weight of the aerated confection product. It will be appreciated that an unaerated sugar candy or confection typically will have a density of about 1.4 g/cc. The aerated confectionery products are porous, i.e., contain air pockets or cells whether open cell or closed. By compressible fluid herein is meant a fluid whose density is responsive to pressure such as a foam. In contrast, water, ilk, cooked cereal doughs fruit purees are substantially incompressible fluids, (i.e., their densities vary little in response to increases in pressure. Aerated confectionery foams are well know and the skilled artisan will have no difficulty in selecting suitable ingredients for forming into foam compositions for use herein. (See, for example, U.S. Pat. No. 4,925,380 issued Oct. 20, 1986 entitled "Multicolor Confection Extrusion System and U.S. Pat. No. 5,019,404 issued Feb. 28, 1990 entitled "Multicolor Confection Extrusion System", each of which are incorporated herein by reference).

Generally, the aerated confections comprise: about 50 to 95% of a saccharide component; about 1 to 30% moisture; and, about 0.5 to 30% of a structuring agent.

Preferably, the saccharide component is used at about 70% to 90% of the confectionery compositions. The saccharide component can include pure monosaccharide dextrose (e.g., anhydrous, monohydrate or dextrose syrup) and disaccharide sugars such as sucrose, and fructose, as well as hydrolyzed starch syrups such as corn syrup which include dextrin, maltose and dextrose, invert sugar syrups which include levulose and dextrose and/or converted fructose or glucose syrups. A portion of the saccharide component may be supplied by impure or flavored saccharidic ingredients such as fruit juices, purees, honey nectars, concentrated fruit juices, fruit flavors and mixtures thereof. The saccharide component can also include polysaccharides such as cornstarch.

The composition of the aerated confection foam essentially further includes about 0.5 to 30%, preferably about 1 to 4%, and most preferably about 2.5% weight of a foam structuring or gelling component. Suitable structuring components include whipping agents (e.g., soy proteins, albumen, sodium caseinate, whey protein malted milk, and mixtures thereof), hydrocolloid colloids such as pectin, gelatin, modified starches, gums and mixtures thereof. For products to be marketed in North America, the preferred structuring agent is gelatin. The gelatin can be derived from bovine, porcine, or piscine (fish) sources or can be of mixtures thereof.

In more preferred embodiments the foam comprises: about 40% to 50% sucrose (dry weight basis); about 20% to 30% corn syrup (dry weight basis); about 2% to 4% gelatin (dry weight basis); and, about 10 to 25% moisture.

In one preferred embodiment, the marshmallows are fat free, i.e., have fat contents of less than 5% (dry weight basis)preferably less than 0.5%. In these embodiments, the fat level is provided by lipid content associated with one or more ingredients as compared to addition of a fat component. In other variations, e.g., chocolates, the aerated confection can comprise an added fat constituent such as about 1 to 10% cocoa butter, dairy fat or dairy fat containing (e.g., cheese) or other edible fatty triglyceride or fat mimics such as sucrose polyesters.

The extrudable confectionery food product compositions can further comprise a wide variety of supplemental materials to improve the organoleptic, visual, or nutritional properties of the finished confectionery products. Useful materials include, for example, colors, flavors, high potency sweeteners, preservatives, nutritional fortifying ingredients mixtures thereof. If present, such optional materials can collectively comprise from about 0.01% to about 25% by weight of the present products, preferably about 1 to 10%.

More preferably, any insoluble component such as mineral fortifying ingredient (e.g., calcium carbonate for calcium fortification) is added in the form of a fine powder having a particle size such that 90% has a particle size of less than 150 micron, preferably 100 $\mu$m or less in size.

The extrudable confectionery food product compositions can be optionally flavored and/or colored to provide uniform products or products having phases of variously colored and flavored potions. By "color" is meant a confection of any color, including white, which may be provided by the base confection ingredients, and by additional artificial or natural coloring agents. "Color" also includes various hues or shades, e.g., pink and red.

In more preferred embodiments, the extruded confectionery food product when an confectionery foam is substantially free of any flour or pure starch component (i.e., less than 0.5% dry weight basis) and especially of any ungellatinized starch or flour material Of course, modified starches that are used as a structuring agent can be used. The moisture content of the extrudable confectionery food product foam upon being combined with the second food material, can immediately prior to, immediately after extrusion range from about 12 to 30%, preferably about 12 to 25%.

The confection compositions have densities of 0.10 to 1.0 g/cc, preferably about 0.15 to 0.3 g/cc after extrusion. The foams can be aerated with air or preferably with nitrogen gas. At the point in the present process at which the second flowable food material be combined with the aerated confectionery foam, the foam is in the form of a compressible fluid. The confectionery foam has a viscosity generally ranging from about 10,000 to 30,000 cps preferably about 15,000 to 25,000 cps.

In one preferred embodiment the second flowable food material is preferably an edible "ink". Good results are obtained when an edible ink material comprises: about 60 to 70% corn syrup (dry weight basis); 1 to 10%, preferably about 4% to 8% of colorant(s), preferably about 6%, and the balance moisture. While any edible colorant can be used preferred for use herein are insoluble colorants such as Lake pigments such as a black. The edible ink preferably has a viscosity of about 20 to 2,000 cps, preferably about 500 to 2,000 cps. Maintenance of the edible ink at such high viscosities is helpful to combining the edible ink or liquid colorant with the high viscosity confectionery foam. In other variations the edible ink can comprise about 1 to 10% colorant(s), water and sufficient amounts of a thickening agent to provide the viscosity herein. This high viscosity of the second fluid material is helpful in distributing the second color into the confectionery foam having a higher viscosity to provide a complex pattern without intermixing into the first food material. The fine lines or planes can be all of one color or can include a second color.

If desired, the first food material can further comprise a small quantity of an ingredient that supplies a divalent ion such as soluble calcium or magnesium ion such as calcium chloride or magnesium chloride especially if the second food material contains a calcium or magnesium setting gelling agent. The calcium and magnesium in the first food material helps the second material "set" in place and thereby assists in maintaining the complex pattern through the reduction in cross sectional area.

During the extrusion step, the aerated confectionery extrudable food is maintained at temperatures ranging from about 70° F. to about 180° F. (20° C. to about 85° C.). Preferably, the temperature is maintained above the gelling temperature of the particular foam structuring agent employed. Especially when gelatin is used as a structuring agent, preferred methods control the exit temperature to about 95° F. to about 115° F. Reducing passageway can be optionally cooled to assist in precise temperature control.

In certain preferred embodiments, especially for when the first extrudable food mass is an aerated foam, the orientation of the apparatus is such that the exit port 13 is such that the foam is extruded in a substantially vertical, or preferably vertical downward direction. The orientation assists in providing a few seconds for the aerated foam to set after extrusion to assist in maintaining the complex pattern.

Inasmuch as the foams are aerated prior to the expansion, the degree of expansion after extrusion is modest or nominal. As a result, the degree of detail able to be achieved or line resolution can be as fine as below 0.1 mm in the finished confectionery food piece.

In other variations, the second flavorable material can be a second confectionery or foam of a similar or different composition or properties.

Thereafter, the present methods when an aerated confectionery foam is the extrudable food can further essentially include a cooling step to allow the structuring agent to set and thereby to form an aerated confection such as a marshmallow. This cooling or setting step can be practiced conveniently by extruding the aerated foam onto a corn starch bed to control stickiness. As a result, the food pieces can comprise about 1% to 15% topically applied corn starch as part of the saccharide component.

The present methods can further comprise the step of forming or cutting the cooled aerated confectionery extrudate or strand into pieces of desired shape, size and moisture content. Especially desirable are wafer shaped pieces having an opposed pair of major surfaces. The wafer pieces can have a shaped periphery configuration as described above. In one preferred embodiment for the production of smaller confection pieces, the wafer pieces can have a thickness ranging from about 3 to 10 mm; preferably about 4 to 10 mm. To produce such wafer pieces, foam can be extruded in the form of a continuous strand having a cross section of about 15 mm$^2$ to 900 mm$^2$ preferably 100 mm$^2$ to 500 mm$^2$.

In the manufacture of soft marshmallow or other soft confections, the finished fortified products soft marshmallow so prepared are ready for conventional packaging for distribution for sale. Optionally, the soft marshmallow can be subjected to a modest drying step to adjust the moisture content within the moisture content range described herein.

However, in the preparation of a dried aerated confection, the present methods additionally comprise a finish-drying step of the "set" aerated confection pieces to form dried marshmallow pieces. The pieces can be dried to a final moisture content of about 1 to 8%, preferably 1 to 6% to form the present complexly patterned dried aerated confectionery foam pieces herein.

The resulting pieces can then be consumed as confections. The dried marshmallow pieces find particular suitability for use as an appealing added component of food products. For example, the pieces can be added to a Ready-To-Eat ("R-T-E") breakfast cereal, especially sugar coated R-T-E cereals intended as children's breakfast cereals. In certain embodiments, the complexly patterned dried aerated foam products can be admixed with puffed RTE cereal products also having a complexly patterned feature (whether the same or different). In other variations, the confections provide appealing carriers for various ethical drugs, vitamins, minerals and the like. Due to the aerated and frangible texture, the confections are easy to chew and are quickly dissolving.

More surprisingly, it has been discovered that maintenance of a complex pattern while size reducing the cross sectional diameter is less challenging for an aerated confectionery foam. As a result a larger average convergence or confinement angle can be employed for such particular food products. While the present low convergence angles (5° to 45°) can be used for aerated confectionery foams, large average acute convergence angles ranging from over 45° to 650° can also be used. In other embodiments, the average convergence angle ranges from about 5 to 65°, but preferably under 55°. Moreover, cross section reduction ratios as little as 4:1 can be used in certain embodiments and can range to as great as 120:1.

For component products, however (i.e., wherein an aerated confectionery foam is only one portion or phase of a multiphase extruded product especially involving incompressible fluids), smaller acute average convergence angles of 5° to 45° are preferred. While in the present invention, the particular die insert 20 depicted is designed to combine a liquid food color into a first food material such as cooked cereal dough so as to provide line coloration of extremely fine detail, the die insert 20 can be modified (e.g., such as by enlargement of ports 52, 54, and 56, fluid passageways 50, and discharge ports 48) to combine two or more cooked doughs or other flowable colored food materials, especially liquefied fats (e.g., chocolate, cheese), or fruit paste or confection foams. The second extrudable food material (whether liquid, foam dough, etc.) can be all of one color or can have additional colors.

Also, while the particular die insert 20 depicted is designed to provide the swirled finished product depicted, other die inserts can be interchanged to provide the line coloration detail to provide the particular desired and products such as the various sports balls (e.g., soccer, baseball, basketball, American football) referenced above.

It will be appreciated that for those embodiments that are extruded without direct expansion or puffing upon extrusion that lines having a detail of about 0.1 mm in width can be obtained. Upon subsequent expansion (e.g., deep fat frying, gun puffing, fluidized bed puffing, radiant heat puffing or other puffing methods), puffed pieces will of course expand causing an increase in the width of the line. These enlarged lines (i.e., 0.5 mm>), however, are nonetheless thinner than lines obtained by any other known method. If desired, thicker lines (e.g., about 3 mm) can also be formed.

Other dough flow adjustment devices can be used with or in substitution for the preferred flow adjuster plug 16 herein if 1) positioned upstream of the die insert 20, and 2) do not increase the likelihood of downstream plugging. For example, and referring to FIGS. 10 and 11, an alternate embodiment of a dough manifold 100 is shown according to preferred teachings of the present invention. In particular, manifold 100 includes body portions 102, 104, 106 and 108 which are secured together into a unitary assembly. In particular, body portion 102 includes a circular disc 110 which abuts with the mounting flange 112 of the outlet of food cooker extruder 12. Disc 110 can be secured to extruder 12 by any conventional means and in the preferred form includes an annular lip 114 formed on its outer periphery at the inner axial end which abuts with flange 112, with lip 114 being of a size and shape generally corresponding to flange 112.

Figure 10:
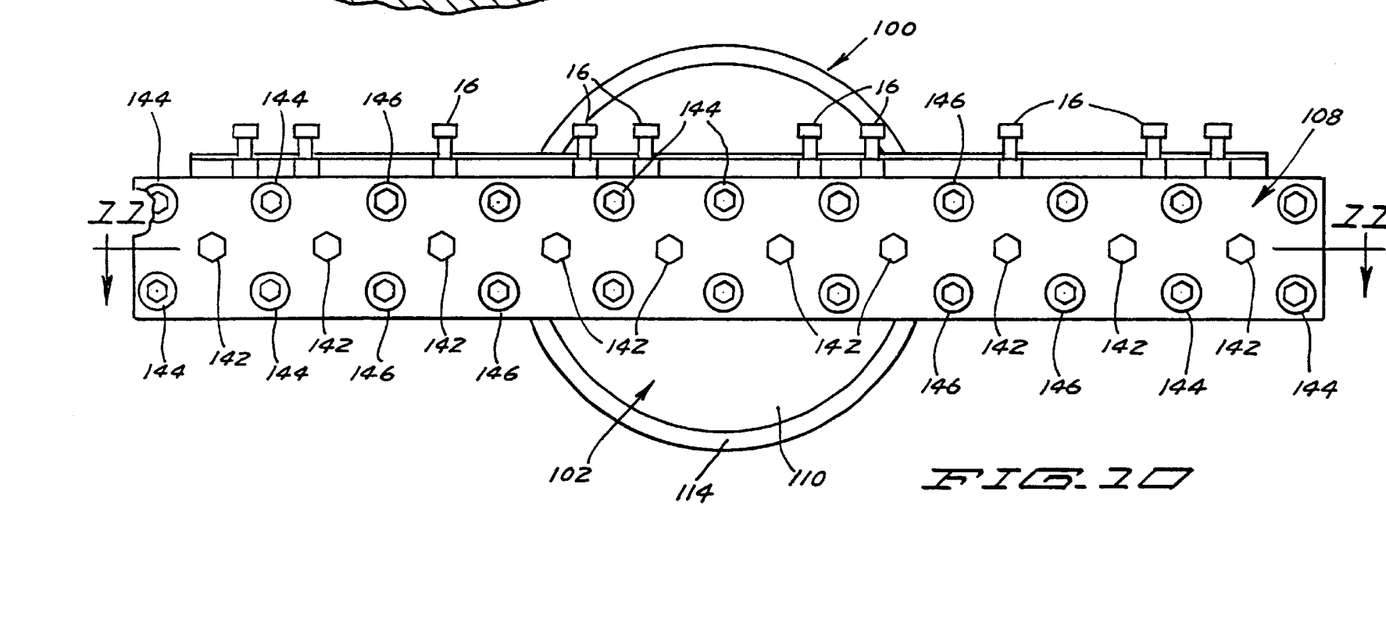
FIG. 10 is a front elevational view of a manifold for making multiple extrudates secured to the outlet of a food cooker extruder.

Bores or conduit portions 118 intersect at the inner axial end of disc 110 at the center line of extruder 12 and disc 110 and extend therefrom at equal acute angles on opposite sides of the center line of extruder 12 and disc 110 in the order of 62° in the most preferred form, with the center lines of bores 118 and the center line of extruder 12 and disc 110 being arranged in a horizontal plane in the most preferred form.

Body portion 102 further includes first and second pipes or conduit portions 116 which extend linearly from bores 118 formed in disc 110 past the outer axial end of disc 110 to equal distances from disc 110.

Body portion 102 further includes first and second conduit portions 120 located on opposite sides, parallel to, and at equal distances from the center line of extruder 12 and disc 110, with the center lines of conduit portions 120, extruder 12 and disc 110 being arranged in a horizontal plane in the most preferred form. Conduit portions 120 have cross sections of an equal size and shape to pipes 116. The outer axial ends of first and second pipes 116 opposite to disc 110 are integrally connected to and in fluid communication with the inner axial ends of first and second conduit portions 120, respectively, in the most preferred form by a mitered interconnection. The outer axial ends of conduit portions 120 are equally spaced from disc 110 and extruder 12.

Body portion 102 further includes a flat mounting plate 122 which is held generally perpendicular to the center lines of conduit portions 120, extruder 12 and disc 110 by a support 124 extending between and integrally connected to the outer axial end of disc 110 and the inner axial end of plate 122. Conduit portions 120 extend through suitable bores formed in mounting plate 122 and are integrally secured to mounting plate 122. The outer axial end of mounting plate 122 is perpendicular to the center lines of conduit portions 120, disc 110, and extruder 12 and is at the same axial extent from disc 110 and extruder 12 as the outer axial ends of conduit portions 120.

Body portion 104 is in the most preferred form of a block having an inner axial end which abuts with mounting plate 122. Body portion 104 is symmetrical on opposite sides of the center line of disc 110 and extruder 12 according to preferred teachings of the present invention. In particular, body portion 104 includes first and second conical chambers 126 having center lines which are linear with the center lines of conduit portions 120. The bases of chambers 126 are located at the inner axial end of body portion 104 and have a diameter equal to the inner diameter of conduit portions 120.

First and second passageway portions 128 of equal size and diameter extend from each of chambers 126 at equal acute angles on opposite sides of the center line of chamber 126 and conduit portion 120 in the order of 49° in the most preferred form, with the center lines of passageway portions 128, chambers 126, conduit portions 120, bores 118, pipes 116 and extruder 12 being arranged in a horizontal plane in the most preferred form. Body portion 104 further includes third and fourth passageway portions 130 in fluid communication with first and second passageways 128, respectively, and located on opposite sides, parallel to and at equal distances from the center lines of the first and second chambers 126 and conduit portions 120, respectively, with the center lines of passageway portions 128 and 130 being in a horizontal plane in the most preferred form. Passageway portions 128 and 130 have cross sections of an equal size and shape and in the most preferred form have diameters which are approximately 57% of the diameter of conduit portions 116, 118, and 120.

Body portion 104 further includes first and second duct portions 132 having center lines which are coextensive with the center lines of the first and second chambers 126 and conduit portions 120, respectively, with duct portions 132 extending from chambers 126 concentric to the center line of chambers 126 and opposite to their bases. In the most preferred form, duct portions 132 have a cross-sectional shape corresponding to passageway portions 128 and 130 which is circular in the most preferred form but have a size which is smaller than passageway portions 128 and 130 and in the most preferred form have diameters equal to approximately 65% of the diameter of passageway portions 128 and 130. In the most preferred form, duct portions 132 have a size which do not intersect with passageway portions 128 at chamber 126, with duct portions 132 having a diameter equal to the diameter of chambers 126 equal to the outer axial extent of passageway portions 128 at the surfaces of chambers 126 in the most preferred form.

Body portion 106 is in the most preferred form of a block having an inner axial end which abuts with the outer axial end of body portion 104. Body portion 106 is symmetrical on opposite sides of the center line of disc 110 and extruder 12 according to the teachings of the present invention. In particular, first and second ports 134 of equal size and diameter extend from the first passageway portions 130 extending from first and second chambers 126 at equal acute angles on opposite sides of the center line of first passageway portion 130 in the order of 43° in the most preferred form, with the center lines of ports 134 and passageway portions 130 being arranged in a horizontal plane in the most preferred form. Further, third and fourth ports 136 of equal size and diameter extend from the second passageway portion 130 extending from first and second chambers 126 at equal acute angles on opposite sides of the center line of second passageway portion 130 in the order of 430 in the most preferred form, with the center lines of ports 136 and passageway portions 130 being arranged in a horizontal plane in the most preferred form. Ports 134 and 136 have equal lengths. Body portion 106 further includes first and second duct portions 138 having center lines which are coextensive with the center lines of first and second duct portions 132 and chambers 126 of body portion 104 and of conduit portions 120, respectively. Duct portions 138 have a cross-sectional size and shape corresponding to duct portions 132. Ports 134 and 136 have the same cross-sectional size and shape which in the preferred form also are equal to the cross-sectional size and shape of duct portions 132 and 138.

Body portion 106 according to the preferred teachings of the present invention then includes a plurality of flow adjuster plugs 16 of a number corresponding to the total number of ports 134 and 136 and duct portions 138 formed therein and mounted to the upper surface thereof. In particular, plugs 16 are mounted such that smooth portion 86 can be adjustably extended into the corresponding port 134 or 136 or duct portion 138 to adjust the flow rate and pressure of the dough flow therethrough.

Body portion 108 is in the most preferred form of a block having an inner axial end which abuts with the outer axial end of body portion 106. Body portion 108 is symmetrical on opposite axial sides of the center line of disc 110 and extruder 12 according to the teachings of the present invention. In particular, sockets 140 equal in number and location to ports 134 and 136 and duct portion 138 are provided for slideable receipt of the desired inserts 142. It can be appreciated that inserts 142 can be of the type including die inserts 20 and passageway pieces 26, 28, and 30 or can be of alternate types and forms.

Body portions 102, 104, 106, 108 can then be suitably secured together such as by bolts 144 extending through body portions 108 and 106 and threaded into body portion 104 and by bolts 146 extending through body portions 108, 106, and 104 and threaded into mounting plate 122. To insure proper alignment and for ease of assembly, dowel pins 148, 150, and 152 can be provided between body portions 108 and 106, body portions 106 and 104, and body portion 104 and mounting plate 122, respectively.

In operation of manifold 100 according to the teachings of the present invention, dough extruded by extruder 12 will flow through flow paths at equal rates and pressure through conduits 116, 118, and 120 into chamber 126 since they provide the same resistance to flow due to their equal lengths, cross-sectional sizes and shapes, and arrangement much like through passageways 14. Likewise, dough will flow through passageways 128 and 130 from chambers 126 at equal rates and pressure since they provide the same resistance to flow due to their equal lengths, cross-sectional size and shape, and arrangement. Similarly dough will flow through ports 134 and 136 from passageways 128 and 130 at equal rates and pressure since they provide the same resistance to flow due to their equal lengths, cross-sectional size and shape, and arrangement. However, since ducts 132 and 138 have a smaller cross-sectional size than passageways 128 and 130, the flow rate of dough through a single duct 132 and 138 is one-half the flow rate through one of ports 134 and 136. In particular, due to the much shorter length that the dough must flow to reach die inserts 142 through one duct 132 and 138, the cross-sectional size is reduced to a size to provide equal flow resistance therethrough as through dough flowing through one of the ports 134 and 136. Further, according to the preferred teachings of the present invention, the cross-sectional size of ports 134 and 136 and ducts 132 and 138 are equal for ease of fabrication and to allow the same size adjuster plugs 16 to be utilized in all of the ports 134 and 136 and duct portions 138.

It can then be appreciated that the flow rate and pressure from extruder 12 to inserts 142 are equal even though the flow distances from extruder 12 to inserts 142 are not equal according to the teachings of the present invention. Specifically, the flow rate and pressure to inserts 142 are generally compensated by providing unequal flow areas to effect equalizing flow resistance and are fine tuned through the use of adjuster plugs 16 according to the teachings of the present invention. Thus, utilizing the present invention, it is no longer required that the inserts 142 be located in a circular pattern centered on the center line of extruder 12 to obtain equal flow distances in symmetrical arrangements. Particularly, other patterns are possible according to the teachings of the present invention such as horizontal in a single plane which avoids problems of individual extrudates interfering with each other such as upper extrudates falling on lower extrudates in the circular pattern and which allows easier placement on horizontally arranged conveyors.

Now that the basic teachings of the present invention have been explained, many extensions and variations will be obvious to one having ordinary skill in the art. For example, several inventive aspects of the present invention have been disclosed and it is believed that the combination thereof produces synergistic results. However, such inventive aspects can be utilized alone or in other combinations according to the teachings of the present invention. As an example, although notches 47 have been disclosed in die insert 20 forming complexly patterned extrudates, similar inserts could be provided upstream of a static mixer to provide several lines of colorant, flavor or other additives rather than typical point type injections into the cross section of flow. In particular, notches 47 prevent the colorant, flavor or other additives from coming in contact with the interior surface wall of the insert where the static mixer has difficulty mixing it thoroughly with the main flow of product. This would allow the static mixer to be shorter and still provide a uniform extrudate and thus reducing the cost, space and pressure drop requirements of the static mixer.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method for preparing a food product having at least two colors exhibiting improved detail resolution; comprising the steps of:

A. providing a first plastic extrudable food mass having a first color;

B. providing at least a second flowable food material having a second color differing from the first color in color or hue;

C. combining the first food mass and the second food material without intermixing to form a complexly patterned food mass having an initial cross sectional area;

D. reducing the cross sectional area of the complexly patterned food mass by a factor of at least 4:1 through a reducing passageway with an average convergence angle of 5° to 65° while maintaining the cross sectional pattern to form a reduced cross sectional patterned extrudate; and E. extruding the reduced cross sectional extrudate through a die port.

2. The method of claim 1 wherein the second food material is a compressible fluid.

3. The method of claim 1 wherein the average convergence angle ranges from about 5 to 45°.

4. The method of claim 1 wherein the average convergence angle ranges from about 45 to 55°.

5. The method of claim 1 wherein the first food mass is a compressible fluid.

6. The method of claim 1 wherein the first food mass and second food material are combined in a passageway of an extruder with a die dividing insert therein and wherein the reducing passageway is continuous.

7. The method as claim 6 wherein the cross sectional area is reduced in a converging frusto conically shaped passageway.

8. The method of claim 6 wherein the reducing passageway includes an average convergence angle of about 45° to about 65°.

9. The method of claim 1 wherein the initial cross section of the complexly patterned food mass is about 1200 to 3600 $mm^2$ and wherein the reduced cross sectional area is about 10 to 900 $mm^2$.

10. The method of claim 9 wherein the first food mass is a confectionery foam.

11. The method of claim 10 wherein the second food material is a confectionery foam.

12. The method of claim 10 wherein the first food mass has a viscosity of about 10,000 to 30,000 centipoise (cps).

13. The method of claim 1 wherein the first plastic extrudable food mass comprises a confectionery foam.

14. The method of claim 13 wherein the confectionery foam has a fat content of less than about 0.5%.

15. The method of claim 13 wherein the confectionery foam is substantially free of starch.

16. The method of claim 13 wherein the confectionery foam is in the form of at least one continuous strand having a cross sectional area of about 100 to 400 $mm^2$ of about 10 to 20 mm.

17. The method of claim 16 additionally comprising the step of: cutting the strand into pieces.

18. The method of claim 17 additionally comprising the step of:

drying the pieces to a moisture content of about 1 to 6%.

19. The method of claim 18 wherein the colorant comprises edible black powder.

20. The method of claim 13 wherein the confectionery foam comprises:

about 50 to 98% of a saccharide component;

about 12 to 30% moisture; and, about 0.5 to 30% of a structuring agent;

said confectionery foam having a density of about 0.1 to 1.0 g/cc.

21. The method of claim 20 additionally comprising the step of: drying to a final moisture content of about 1% to 6%.

22. The method of claim 20 wherein the confectionery foam has a temperature of about 70° F. to about 180° F.

23. The method of claim 22 wherein the confectionery foam is extruded in a substantially vertical downward direction.

24. The method of claim 22 wherein the confectionery foam has a density of about 0.15 to 0.3 g/cc.

25. The method of claim 24 wherein the confectionery foam comprises:
   about 40% to 50% sucrose;
   about 20% to 30% corn syrup (dry weight basis);
   about 2% to 4% gelatin; and,
   about 10 to 25% moisture.

26. The method of claim 25 wherein the second food material comprises an edible ink.

27. The method of claim 25 wherein the second food material comprises:
   about 60 to 70% corn syrup (dry weight basis) about 4% to 8% colorant, and
   the balance moisture.

28. The method of claim 27 wherein the colorant comprises edible black powder.

29. The method of claim 25 wherein the second food material has a viscosity of about 20 to 2,000 cps.

30. The method of claim 29 wherein the second food material comprises water, colorants and sufficient amounts of a thickening agent to provide the second food material with a viscosity of 20 to 2,000 cps.

31. The method of claim 30 wherein the second food material additionally comprises a water soluble calcium or magnesium ingredient.

* * * * *